United States Patent

Itakura et al.

[11] Patent Number: 5,915,662
[45] Date of Patent: Jun. 29, 1999

[54] AN·ISOTROPIC DAMPER

[75] Inventors: Masayuki Itakura; Yukihiro Kidokoro, both of Tokyo, Japan

[73] Assignee: Polymatech Co., Ltd., Tokyo, Japan

[21] Appl. No.: 08/914,964

[22] Filed: Aug. 20, 1997

[30] Foreign Application Priority Data

Dec. 6, 1996 [JP] Japan ................................ 8-340428

[51] Int. Cl.⁶ .................................................. F16M 13/00
[52] U.S. Cl. ........................ 248/561; 248/621; 248/638
[58] Field of Search ................................ 248/561, 621, 248/634, 638; 369/263

[56] References Cited

U.S. PATENT DOCUMENTS

| | | | |
|---|---|---|---|
| 3,813,776 | 6/1974 | Frederickson et al. | 248/659 |
| 4,182,138 | 1/1980 | McGuire | 248/613 |
| 4,976,412 | 12/1990 | Simon et al. | 248/632 |
| 5,087,491 | 2/1992 | Barrett | 248/560 |
| 5,102,107 | 4/1992 | Simon et al. | 248/621 |
| 5,347,507 | 9/1994 | Kuhn | 369/263 |
| 5,691,037 | 11/1997 | McCutcheon et al. | 248/636 |
| 5,768,249 | 6/1998 | Ro et al. | 369/263 |

*Primary Examiner*—Ramon O. Ramirez
*Assistant Examiner*—Robert Lipcsik
*Attorney, Agent, or Firm*—McGlew and Tuttle, P.C.

[57] ABSTRACT

To provide an an.isotropic damper using an elastic member having an $\underline{E}$ value two times or more larger than that of an elastic member for damping the vibration in the vertical direction to a portion for supporting the rotary part of an optical disk or the like and a mechanical chassis mounting an optical pickup and to the portion for damping the vibration in the planar direction, and comprising two types of elastic members for controlling the fluctuation in the relative distance between the optical pickup and the disk.

8 Claims, 4 Drawing Sheets

AN·ISOTROPIC DAMPER

FIELD OF THE INVENTION

The present invention relates to a damper for reducing vibrations through vibration suppression or vibration isolation by using an elastic body for an acoustic equipments, video equipments, information equipments, or various types of precision instruments, particularly used for an apparatus using an optical disk medium such as a CD, CD-ROM optical disk, or photomagnetic disk.

BACKGROUND OF THE INVENTION

A conventional damper for supporting a mechanical chassis of an optical disk unit and so on is a push-type damper comprising one type of elastic body having an E value of $1.0 \times 10^4$ kg/cm$^2$ or less as shown in FIG. 5 or 6. Usually, a damper is generally used which comprises an elastic body holding a rotary part or drive means 8 of a rotating component such as a medium disk 3 and a mechanical chassis 2 mounting an optical transmitter or optical receiver (hereinafter referred to as optical pickup 4) on the face side and fixing them to a box 5 with a screw 6 or the like as shown in FIG. 7.

The conventional push type damper comprising one type of elastic body has a shape shown in FIG. 5 or 6, and the ratio between spring constants in the directions vertical to and parallel with the plane of the disk 3 ranges between approx. 0.5 and 2 times, even if spring constants are changed.

Conventionally, the characteristic requested for a damper is to provide an effect of the reduction of transmissibility of vibration acceleration by suppressing vibration so that the relative distance between the disk 3 and the optical pickup 4 can be kept constant, specifically by keeping the natural frequency due to the damper at the square root of 0.5 or less at a purposed frequency and therefore a spring constant to the total weight of the mechanical chassis 2, disk 3, and optical pickup 4 is obtained.

However, the rotating disk 3 produces vibration in the direction vertical to the rotation axis due to weight imbalance caused by a dimensional tolerance, machining error or the like, namely in the direction parallel with the disk. Unless the damper has only a low elasticity to the vibration, the mechanical chassis itself greatly vibrates. To stop the vibration, it is necessary to control the vibration with a force larger than the angular moment due to the weight imbalance. To control the vibration, it is preferable to use a method of fixing the mechanical chassis to the box or base 5. However, if the ratio between spring constants of the damper in the directions vertical to and parallel with the plane of the disk 3 takes a range from approx. 0.5 to 2 times, it is impossible to stop the vibration. On the contrary, vibration having a frequency close to the natural frequency of to the damper, that is, resonance occurs and worse result occurs.

SUMMARY AND OBJECTS OF THE INVENTION

It is an object of the present invention to restrain fluctuations in the relative distance between an optical unit for writing or reading data in the direction vertical to a disk face and the disk, by forming a part or the whole of a damper for holding a mechanical chassis with a low-elasticity body, and by restraining the self-producing vibration produced due to disk rotation in the disk face direction.

The present invention accomplishes this object by placing the rotating component, such as a disk, and a rotary drive means for rotating the disk on a chassis. The chassis is connected to the rotary drive means and supports the rotary drive means. A base is connected to, and supports, the chassis. A damper is connected between the base and the chassis, with the damper including first and second elastic bodies. The first elastic body is formed of a first material and primarily supports chassis and damps vibration in a direction substantially perpendicular to a plane of rotation of the rotating component. The second elastic body is formed of a different material and primarily supports the chassis and damps vibration in a direction substantially parallel with the rotating plane. The material of the second elastic body has a dynamic compression elastic modulus greater than a dynamic compression elastic modulus of the material of the first elastic body.

In the preferred embodiments, the dynamic compression elastic modulus of the second elastic body is greater than or equal to twice the dynamic compression elastic modulus of the first elastic body. Also the dynamic compression elastic modulus of the first elastic body is less than or equal to $1.0 \times 10^{4k}$ g/cm$^2$, and a loss factor of said first elastic body is less than or equal to 0.01.

The damper is preferably shaped as a hollow cylinder with first and second ends and a middle portion. The middle portion has a diameter less than a diameter of said first and second ends. The chassis defines an opening, and the middle portion of the damper is positioned in the opening of the chassis. This middle portion includes the second elastic body.

The second elastic body can either have a cylindrical shape, or can be formed from a plurality of elastic pieces radially arranged in the damper. Also the first and second elastic bodies can be formed of either thermosetting material or thermoplastic material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 7:
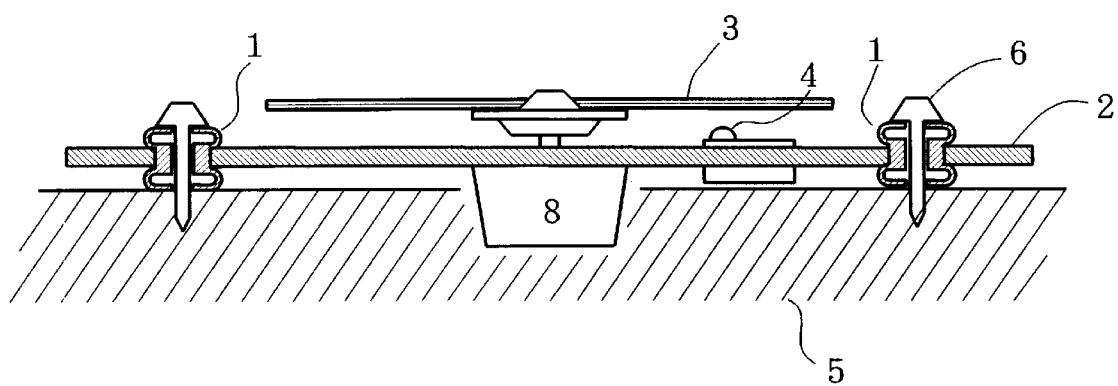
FIG. 7 is a longitudinal sectional view of a mechanical chassis supported with a damper.

Referring to the drawings and in particular to FIG. 7, a base 5 supports a chassis 2 to a damper 1 and screw 6. The chassis 2 supports a rotary drive means 8. The rotary drive means 8 rotates a rotating component 3, such as a magnetic or optical disk.

The present invention uses a push-shaped damper for supporting a mechanical chassis without greatly changing the shape of a conventional damper.

Figure 1:
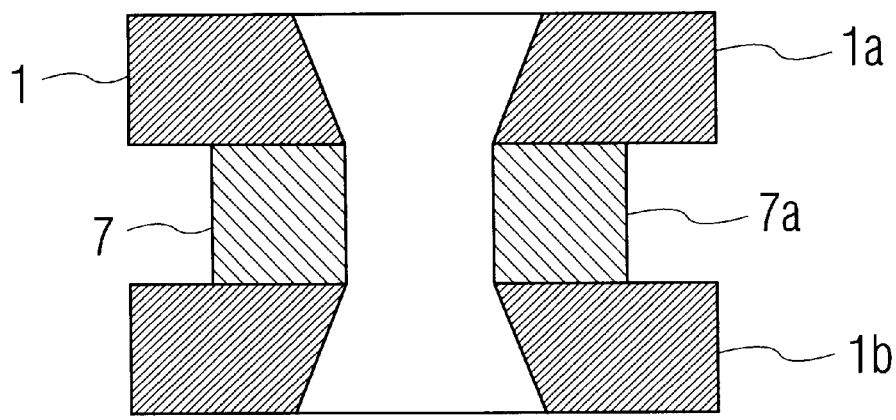
FIG. 1 is a longitudinal sectional view of an an.isotropic damper according to the present invention in which the whole of the setting part comprises a high-elasticity body.

The present invention is described below in accordance with the embodiment shown in FIGS. 1 and 2.

The damper 1 is formed of a first elastic body 1a, 1b and a second elastic body 7. The first elastic body 1a, 1b is used for supporting the chassis 2 in a direction vertical or substantially perpendicular to the plane of the disk 3 and is formed of a rubber-like elastic material having an E value of $1.0 \times 10^4$ kg/cm$^2$ or less (hereinafter referred to as low-elasticity body 1a, 1b). The E value of $1.0 \times 10^4$ kg/cm$^2$ or less corresponds to 70 hardness or less in terms of the JIS (Japan Industrial Standards) rubber hardness class A. Therefore, the rubber-like elastic body has a general rubber elasticity. Moreover, the second elastic body 7 is for supporting the chassis 2 in the direction parallel with the disk, or for the whole 7a or a part 7b of the middle cylindrical portion of the damper. The middle portion is installed into an opening of the box chassis and is an elastic body (hereinafter referred to as high-elasticity body 7) having an A value two times or more larger than the E value of the low-elasticity body 7a 7b.

A damper of the present invention is characterized by combining and integrating the low-elasticity body 1 and the high-elasticity body 7 having a different E value from each other. The low-elasticity bodies suppress vibration from the outside to the inside of a mechanism causing the fluctuation in the relative distance between the optical pickup 4 and the disk 3 when writing or reading data in the direction vertical to the plane of the disk 3 and the vibration due to the natural vibration of the disk face from the inside to the outside of the Mechanism in the direction vertical to the disk plane, and damps by means of the high-elasticity body 7 the self-producing vibration caused by disk rotation in the disk face direction. A material having a loss factor of tan δ–0.01 or more and a high internal damping property is effective as the high-elasticity body.

Figure 3:
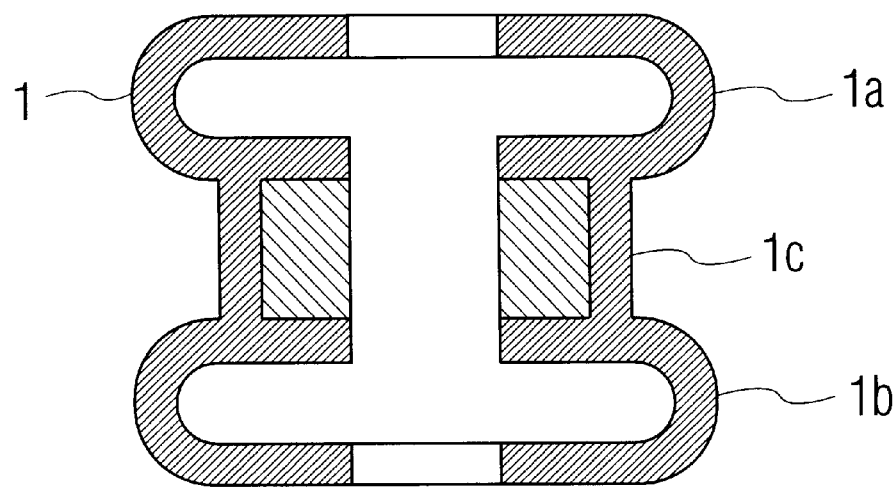
FIG. 3 is a sectional view of an an.isotropic damper according to the present invention in FIG. 2 in which the support part in the direction vertical to the disk face is decreased in diameter.

Another embodiment as shown in FIG. 3 is characterized by forming a low-elasticity body into a hollow cylinder in which upper and lower parts 1a and 1b are larger in diameter than a central part 1c so that the low-elasticity body is inserted into and engaged with a hole formed on the mechanical chassis 2 of an optical disk unit. This improves the vibration isolation characteristics in the vertical direction by decreasing the spring constant in the direction vertical to the disk face. The high-elasticity body 7b is positioned to the axis side of the central small-diameter part 1c, and a composite elastic body with an improved vibration isolating characteristics in the direction parallel with the disk face.

Figure 4:
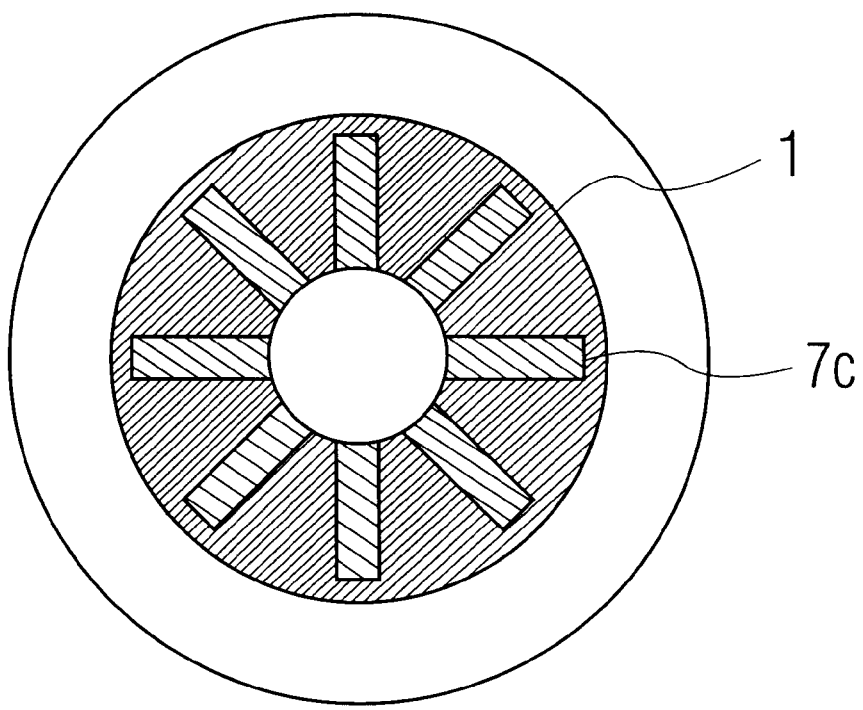
FIG. 4 is a transverse sectional view of the part for setting an an.isotropic damper according to the present invention in which a part of the setting part comprises a high-elasticity body and it is radially divided into a plurality of pieces.

The damper shown in FIG. 4 is characterized by dividing a high-elasticity body used for the whole or a part of the side central small-diameter part 1c into a plurality of pieces. The small diameter part 1c is installed into the mechanical chassis 2 for supporting the chassis in the direction parallel with the plane of the disk 3. The plural of pieces are radially disposing in the low-elasticity body 1 so that crushing in the direction vertical to a push axis can be easily performed and each chassis can be easily engaged with a installing hole.

A composite damper of the present invention is manufactured by a method of forming a low-elasticity body and a high-elasticity body with a thermosetting or thermoplastic member by a metal mold which is a well known art and then bonding the low-elasticity body and high-elasticity body which is a well known art. A method of forming either a low-elasticity body or high-elasticity body by a metal mold and then of inserting it into the remaining elastic body forming mold, or an insert-forming or dichroic-forming method of forming a low-elasticity body and a high-elasticity body with a thermoplastic member in accordance with injection forming is also known.

EMBODIMENT

A damper is manufactured by increasing the upper and lower parts 1a and 1b of an elastic body in diameter and decreasing the central part 1c of the elastic body in diameter. The high-elasticity body 7b has an E value two times or more larger than the E value of the upper and lower parts of the elastic body for the inside of the central part 1c. The high-elasticity body 7b are formed into a ring shape and means of injection molding, by the annular high-elasticity body is inserted into a low-elasticity body forming metal mold. Then the upper and lower parts 1a and 1b of the low-elasticity body are injection molded.

As the elastic body material, styrene-based thermoplastic elastomer JIS A with Hs of 40 hardness and E value of 50 kg/cm$^2$ is used for the low-elasticity body material of the large-diameter parts 1a and 1b.

As other low-elasticity body materials, the following are listed: natural rubber, chloroprene rubber, butyl rubber, silicone rubber, urethane rubber, and thermoplastic elastomer (styrene, olefin, polyester, or urethane based). Elastomers with an E value of $1.0 \times 10^4$ kg/cm$^2$ or less are used.

As the material of the high-elasticity body of the small-diameter part 7b, polypropylene (PP) with E of $2.0 \times 10^4$ kg/cm$^2$ is used and dampers were manufactured from three types of elastic bodies tan δ=0.005, tan δ=0.01, and tan δ=0.05.

As other high-elasticity body materials, the following resins are listed:

the above elastomer, and polyethylene (PE), polyvinylchloride (PVC), polystyrene (PS), acrylonitrile, butadiene, styrene resin (ABS), polyamide (PA), polyacetal (POM), polycarbonate (PBT), polyethylene terephthalate (PET), polybutylene terephthalate (PBT), polyphenylene oxide (PPO), polyphenylene sulfide (PPS), epoxy resin (EP), silicone resin (SI), and polyurethane (PUR).

Vibration tests were performed using the embodiments 1 to 4 of the present invention which are composite elastic bodies manufactured as described above and using comparative example 1 (conventional product) entirely made of the same elastic body.

Figure 2:
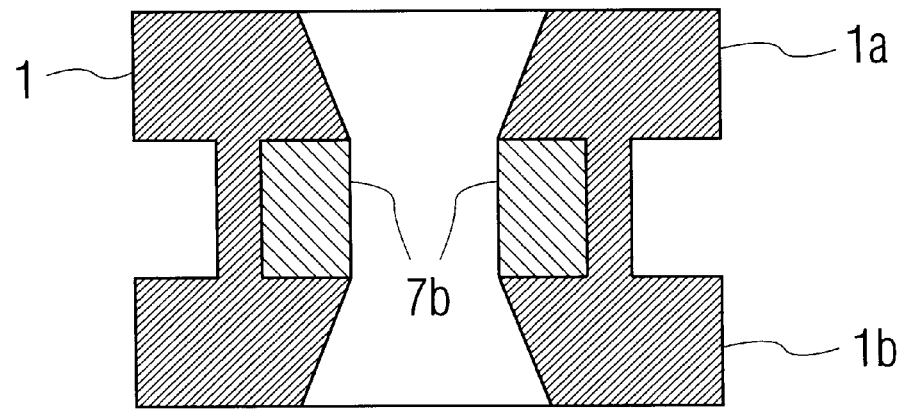
FIG. 2 is a longitudinal sectional view of an an.isotropic damper according to the present invention in which a part of the setting part comprises a high-elasticity body.
Figure 5:
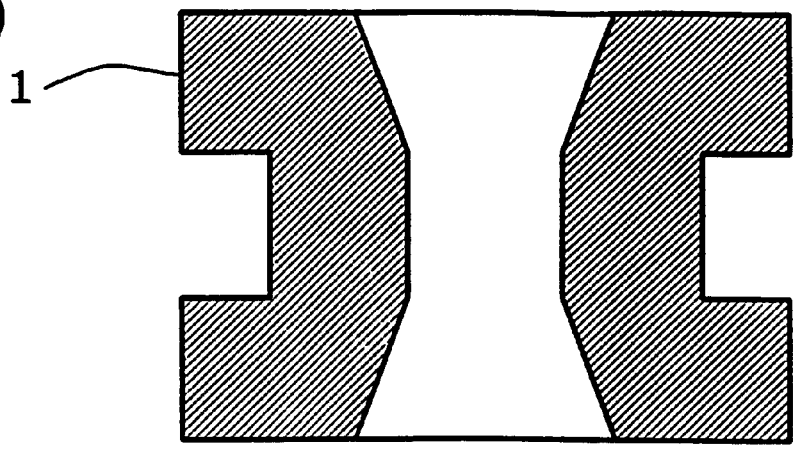
FIG. 5 is a longitudinal sectional view of a conventional push-type damper.
Figure 6:
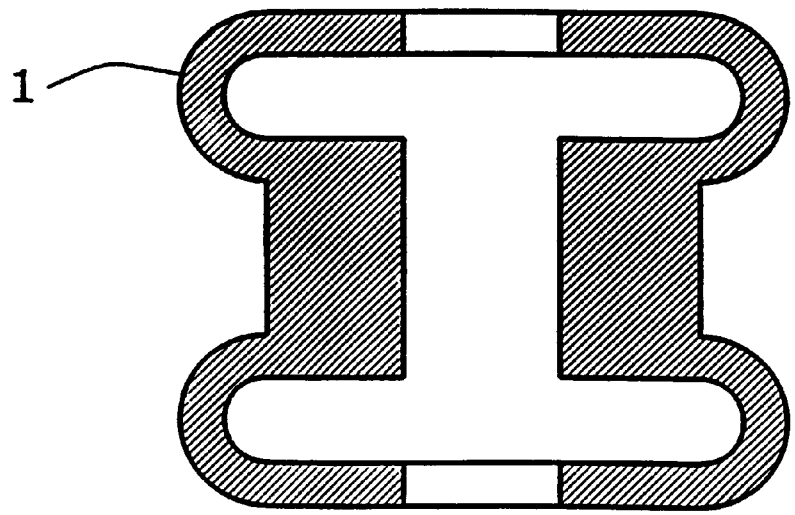
FIG. 6 is a longitudinal sectional view of a conventional push-type damper in which the support part in the direction vertical to a disk face is decreased in diameter.

The material of the comparative example 1 is butyl rubber and has the shape shown in FIG. 5 which is the same as that in FIG. 2.

The vibration test was performed by supporting a 150 g mechanical chassis at four points with dampers, by exciting the chassis with the frequency of 100 Hz at which a disk resonates, and by measuring the acceleration on the mechanical chassis to the excitation acceleration of the vibration. Thus, the acceleration on the mechanical chassis to the excitation acceleration was obtained as a ratio (%).
[Table 1]

By the measurement results in Table 1, it is found that the comparative example 1 and the embodiments 1, 2, and 3 have the same transmissibility of vibration in the direction vertical to the disk. However, in the case of the embodiment 4 having the shape shown in FIG. 3, the low-elasticity body was radially divided and arranged. Therefore, the natural frequency was lowered and thereby, the transmissibility of vibration was also lowered, and the vibration isolating effect was improved.

As the measuring result of the acceleration (G value) according to a mechanical deflection test in the direction parallel with a disk, mechanical deflection occurred because the spring constant in the direction parallel with the disk was small, so a large G value resulted. In embodiment 1, the spring constant was large, mechanical deflection was suppressed and the G value could be reduced up to approx. ⅓ of the G value of a conventional damper. In embodiments 2, 3, and 4, the G value could be further reduced because a material having a large loss factor was used for the high-elasticity body.

Moreover, the G values in the direction parallel with a disk were measured when the ratio between E values of the high-elasticity body and low-elasticity body is 2, 20, and 200 times in the case of the shape shown in FIG. 2. A sample having the same shape and the ratio between E values of high- and low-elasticity bodies which is 1.5 times was used for the comparative example 2.

[Table 2]

In Table 2, it is impossible to accurately read data from a disk because the comparative example 2 has a large G value equal to that of the comparative example 1 entirely made of the same elastic body and the mechanical deflection is large.

In the case of the embodiment 5 in which the E value of the high-elasticity body is two times that of the low-elasticity body, the G value due to mechanical deflection was halved compared to the case of the comparative example 2 and no erroneous operation was observed. Moreover, when the E value is 20 times of that (embodiment 6) and 30 times of that (embodiment 7), the G value was reduced and preferable results were obtained.

From the above results, it is found that mechanical deflection can be reduced by setting the E value of the high-elasticity body to a value two times larger than that of the low-elasticity body and automatic vibration of a high-double-speed mechanics can be controlled.

Embodiments of the present invention are described above. However, these embodiments are just examples. The present invention allows other various shapes corresponding to the shapes (boss, pin, or setting) of the counterparts.

Industrial Applicability

A damper according to the present invention makes it possible to realize the same vibration isolating effect in the direction vertical to a disk face as that of a conventional damper and suppress the vibration in the disk face direction by a combined structure with the high-elasticity body 7. A low-elasticity body provides a preferable effect by decreasing the E value of a rubber-like elastic body to $1.0 \times 10^4$ $kg/cm^2$ or less in order to decrease the natural frequency of the damper. In the case of a high-elasticity body, a force for suppressing vibration, that is, the vibration suppression effect is obtained without resonating with the vibration in the disk face direction by setting the E value of the high-elasticity body to a value two times or more larger than that of the low-elasticity body. For example, when the spring constant ratio according to a shape is increased up to two times and the E value is increased up to two times, the total spring constant ratio is increased up to four times. Therefore, the natural frequency can be obtained by square root and thus, it is increased up to two times. Thereby, it is possible to lower the natural frequency in the direction vertical to the disk face and to raise the natural frequency in the direction of the disk face at the both sides of a purposed frequency.

Moreover, by setting tan δ of the high-elasticity body to 0.01 or more, it is possible to damp the self-producing vibration inside of the high-elasticity body and to further improve the vibration suppressing effect.

Furthermore, by forming a low-elasticity body into a hollow cylinder, it is possible to easily decrease the spring constant and improve the vibration suppression characteristics in the direction vertical to a disk face, without decreasing the vibration suppressing effect in the disk face direction by the high-elasticity body.

Therefore, a damper according to the present invention is most suitable for vibration suppression and vibration isolation of an acoustic equipments, video equipments, information equipments, or various types of precision instruments, particularly an apparatus using an optical disk medium such as a CD, CD-ROM optical disk, or photomagnetic disk.

Moreover, when mounting a damper according to the present invention on a unit, a high-elasticity body is divided into a plurality of pieces to be disposed in the radial direction. The high-elasticity body can be easily mounted because the damper is crushed in the direction vertical to the damper axis and is deformed as a low-elasticity body. Only a small force is required compared to a high-elasticity body which is not divided.

Furthermore, it is possible to insert-form a damper of the present invention by means of a general injection molder or to two-color-form the damper with a plurality of metal molds by using a thermoplastic member as a material of a low-elasticity body and high-elasticity body. This realizes an automation and labor saving, and thus decreases the manufacturing processes.

While specific embodiments of the invention have been shown and described in detail to illustrate the application of the principles of the invention, it will be understood that the invention may be embodied otherwise without departing from such principles.

TABLE 1

| | Comparative | Embodiment | | | |
|---|---|---|---|---|---|
| | 1 (FIG. 5) | 1 (FIG. 2) | 2 (FIG. 2) | 3 (FIG. 3) | 4 (FIG. 4) |
| E value of low-elasticity body (kg g/cm$^2$) | 50 | 50 | 50 | 50 | 50 |
| E value of high-elasticity body (kg g/cm$^2$) | — | $2.0 \times 10^4$ | $2.0 \times 10^4$ | $2.0 \times 10^4$ | $2.0 \times 10^4$ |
| Tan δ of high-elasticity body | — | 0.005 | 0.01 | 0.05 | 0.05 |
| Vibration transmissibility (%) | 10 | 10 | 10 | 10 | 5 |
| Direction parallel with disk (G value) | 2 | 0.7 | 0.5 | 0.4 | 0.4 |

TABLE 2

| | Comparative | Embodiment | | |
|---|---|---|---|---|
| | 2 | 5 | 6 | 7 |
| E value of low-elasticity body (kg g/cm$^2$) | 50 | 50 | 50 | 50 |
| E value of high-elasticity body | 75 | 100 | 1000 | 10000 |

TABLE 2-continued

|  | Comparative | Embodiment | | |
|---|---|---|---|---|
|  | 2 | 5 | 6 | 7 |
| (kg g/cm$^2$) Direction parallel with disk (G value) | 2 | 1 | 0.8 | 0.7 |

What is claimed is:

1. A rotational arrangement comprising:

a rotating component;

a rotary drive means connected to said rotating component, said rotary drive means for rotating said rotating component in a rotating plane;

a chassis connected to, and supporting, said rotary drive means;

a base connected to, and supporting, said chassis;

a damper connected between said base and said chassis, said damper including first and second elastic bodies, said first elastic body primarily supporting said chassis and damping vibration in a direction substantially perpendicular to said rotating plane, said second elastic body primarily supporting said chassis and damping vibration in a direction substantially parallel with said rotating plane, said second elastic body being formed of a material having a dynamic compression elastic modulus greater than a dynamic compression elastic modulus of a material of said first elastic body, said damper is shaped as a hollow cylinder with first and second ends and a middle portion, said middle portion has an external diameter less than an external diameter of said first and second ends, said middle portion includes said second elastic body, said first and second ends include said first elastic body;

said chassis defines an opening, said middle portion of said damper being positioned in said opening of said chassis.

2. The rotational arrangement in accordance with claim 1, wherein:

said dynamic compression elastic modulus of said material of said second elastic body is greater than or equal to twice said dynamic compression elastic modulus of said material of said first elastic body.

3. The rotational arrangement in accordance with claim 1, wherein:

said dynamic compression elastic modulus of said material of said first elastic body is less than or equal to $1.0 \times 10^4$ kg/cm$^2$, and a loss factor of said material of said first elastic body is less than or equal to 0.01.

4. The rotational arrangement in accordance with claim 1, wherein:

said second elastic body has a cylindrical shape.

5. The rotational arrangement in accordance with claim 1, wherein:

said second elastic body includes a plurality of elastic pieces radially arranged in said damper.

6. The rotational arrangement in accordance with claim 1, wherein:

said first and second elastic bodies are formed of a thermosetting material.

7. The rotational arrangement in accordance with claim 1, wherein:

said first and second elastic bodies are formed of a thermoplastic material.

8. The rotational arrangement in accordance with claim 2, wherein:

said dynamic compression elastic modulus of said first elastic body is less than or equal to $1.0 \times 10^4$ kg/cm$^2$, a loss factor of said first elastic body is less than or equal to 0.01;

said second elastic body has one of a cylindrical shape and a plurality of elastic pieces radially arranged in said damper;

said first and second elastic bodies are formed of one of a thermosetting material and a thermoplastic material.

\* \* \* \* \*